UNITED STATES PATENT OFFICE.

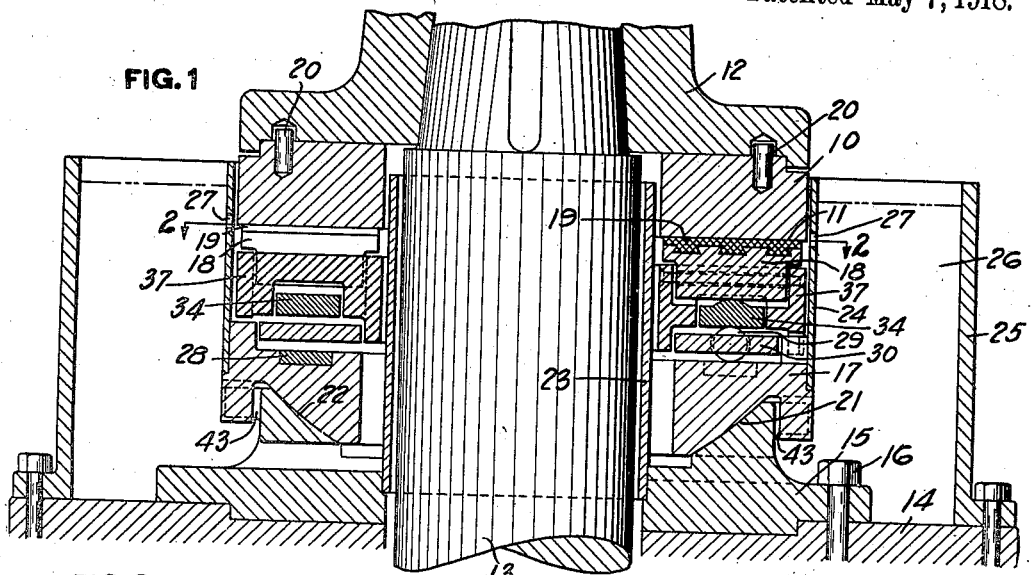
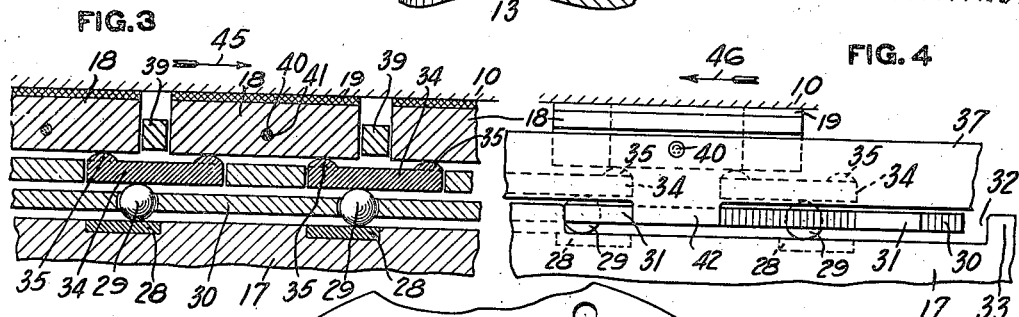
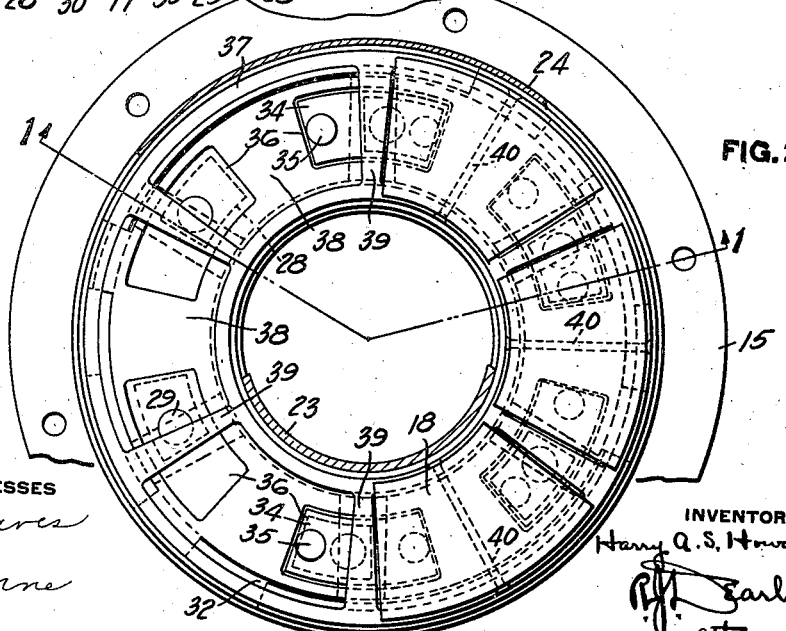

HARRY A. S. HOWARTH, OF PITTSBURGH, PENNSYLVANIA, ASSIGNOR TO ALBERT KINGSBURY, OF PITTSBURGH, PENNSYLVANIA.

THRUST-BEARING.

1,265,334.  Specification of Letters Patent.  Patented May 7, 1918.

Application filed August 16, 1916. Serial No. 115,122.

*To all whom it may concern:*

Be it known that I, HARRY A. S. HOWARTH, a citizen of the United States, and a resident of Pittsburgh, county of Allegheny, and State of Pennsylvania, have invented certain new and useful Improvements in Thrust-Bearings, of which the following is a specification, reference being had to the accompanying drawings, forming a part thereof.

My invention relates to thrust bearings of the shoe type and has special reference to the supports for the bearing shoes and the starting of the bearing from rest in either direction of shaft rotation.

One object of my invention is to provide a bearing of the aforesaid character embodying simple and effective means for automatically adjusting the supporting members for the shoes to adapt the bearing to operate advantageously in either direction of shaft rotation.

Another object is to virtually reduce the starting resistance of a bearing of the shoe type by permitting the shoes to travel a short distance with the rotating parts of the bearing at starting, whereby the momentum of the rotating parts materially assists in overcoming the starting friction.

Other objects and advantages of my invention will be set forth hereinafter, and in order that my invention may be thoroughly understood I will now proceed to describe the same in the following specification and then point out the novel features thereof in appended claims.

Referring to the drawings:

Figure 1 is a sectional elevation taken on the line 1—1 of Fig. 2 of a thrust bearing arranged and constructed in accordance with my invention.

Fig. 2 is a sectional plan view on the line 2—2 of Fig. 1 with certain of the shoes and supporting members removed to disclose the arrangement of parts and the form of the cages of which the bearing is comprised.

Fig. 3 is a sectional elevation of the bearing taken in a medial surface developed into a single plane.

Fig. 4 is a partial elevation illustrating interlocking projections with which certain of the parts are provided as hereinafter explained.

The structure illustrated comprises a thrust collar 10 having a bearing surface 11, a thrust block 12, which is keyed or otherwise suitably secured to a rotatable shaft 13, a base 14, a leveling washer 15 secured thereto by bolts 16 or other suitable means, an equalizing ring 17, a plurality of bearing shoes 18 and supporting members interposed between the equalizing ring and the shoes.

Each of the bearing shoes is preferably provided with a facing 19 of Babbitt or other soft metal and coöperates with the annular bearing surface 11 of the collar 10. One or more dowel pins 20 extend from the collar into suitable recesses in the thrust block 12 so that the collar is constrained to rotate with the thrust block and the shaft.

The leveling washer 15 has a spherically curved upper surface 21 upon which the equalizing ring 17 is mounted, the ring being provided with a correspondingly curved bottom surface 22.

A sleeve 23 is attached to the leveling washer 15 and loosely surrounds the shaft 13 which extends upwardly within the collar 10 above the bearing surfaces and coöperates with the casing 25 to provide a reservoir 26 in which lubricating fluid is contained. A baffle ring 24 is attached to the equalizing ring 17 but is perforated adjacent to the bearing surfaces as indicated at 27. The oil in the reservoir is maintained at sufficient depth to flood the bearing surfaces.

The equalizing ring 17 has a plurality of blocks 28 of hardened steel or the like, set into its upper surface to provide wearing surfaces for bearing balls 29. The balls are held in place and are spaced apart by a ball cage 30, and they only travel relative to the equalizing ring 17 through a short arc; consequently, the hardened blocks 28 may be relatively short as shown in Fig. 3, although, of course, they may be replaced by a ring if desired.

The ball cage 30 has lateral projections 31 which extend outwardly into a notch 32 of a flange 33 with which the equalizing ring 17 is provided. Mounted upon each of the bearing balls 29, is an equalizing block 34 having end lugs or buttons 35 upon which the bearing shoes 18 are mounted. Each shoe is arranged to bridge a pair of equalizing blocks 34 and rests upon a pair of the lugs 35.

In the structure illustrated, the equalizing blocks 34 have the form of ring segments and fit loosely into apertures 36 in the web 38 of a shoe cage 37. The cage is composed of concentric rings joined by the web 38 in which the apertures 36 are formed and radial arms 39 which extend between the rings above the apertures 36 as clearly shown in Fig. 2. The equalizing blocks 34 fit loosely into the apertures 36, as already explained, and the bearing shoes 18 fit loosely between the arms 39 and the rings.

The shoe cage 37 is supported by pins or rivets 40 which extend radially through holes 41 in the shoes. The pins fit loosely in the holes and the holes are substantially in the center of the shoes so that the shoes are free to tilt during the operation of the bearing.

The shoe cage 37 has a projection or lug 42 which extends downwardly between the lugs 31 of the ball cage 30.

The recess 32 is so proportioned as to provide for a limited rotative movement of the ball cage 30, and the lugs 31 and 42 are spaced to permit substantially twice as great a rotative movement of the shoe cage 37 together with the equalizing blocks 34 and the shoes 18; in other words, the shoe cage together with the equalizing blocks and shoes, is free to roll upon the bearing balls 29 through a limited arc. During this movement the point of support for each of the equalizing blocks 34 is shifted from one side of the center, as shown in Fig. 3, to a corresponding position on the opposite side of the center, as shown in Fig. 4. The bearing balls 29 obviously constitute tilting supports for the equalizing blocks and the shoes are so mounted on the blocks that they are free to assume tilted positions in accordance with the copending application of Albert Kingsbury and myself, Serial No. 95,557 filed May 5, 1916, entitled Thrust bearing.

The leveling washer 15 is provided with laterally extending lugs 43 which coöperate with suitable notches in the equalizing ring 17 to prevent the rotation of the equalizing ring relative to the washer.

Assuming that the parts occupy the positions as shown in Fig. 3, it will be observed that each of the equalizing blocks 34 is supported to the left of its center. With this arrangement, a greater pressure is exerted at the right hand end of the shoe than at the left hand end, the resultant being equivalent to a tilting support for the shoe, offset slightly from the center, which is the most desirable condition for operation in one direction of shaft rotation as indicated by the arrow 45 in Fig. 3.

If, on the other hand, the shaft and collar are rotated in the opposite direction as indicated by the arrow 46, Fig. 4, the shoe cage, shoes and equalizing blocks are moved rotatively, bringing the parts into the positions shown in Fig. 4. It will be observed that the shoes are now virtually supported on a pivot at the opposite side of the center or in other words, a point which is always in advance of the center of the shoe for either direction of shaft rotation.

The structure shown and described is illustrative of my invention, which may be embodied in various modified structures, and I intend that only such limitations be imposed as are indicated by the appended claims.

What I claim is:

1. A thrust bearing comprising a plurality of equalizing blocks, means for supporting the blocks at one side or the other of their centers depending on the direction of bearing operation, and bearing members mounted on the blocks and each arranged to have the resultant reaction of its support shifted automatically in response to the adjustment of the supporting means for the blocks.

2. A thrust bearing comprising a rotatable member having an annular thrust surface, a relatively stationary support, rolling bearing members thereon, equalizing blocks on the rolling bearing members, and a plurality of bearing shoes having bearing surfaces coöperating with the annual bearing surface and supporting the rotatable member, each of said shoes being mounted upon a pair of said equalizing blocks, and means for permitting a limited rotative movement of the shoes and equalizing blocks relative to the stationary support.

3. A bearing comprising a rotatable member having an annular bearing surface, a stationary base, a leveling washer thereon, an equalizing ring mounted on the leveling washer, a plurality of bearing balls mounted on the ring, a ball cage for holding the balls in position, equalizing blocks severally and tiltably mounted on the balls and bearing shoes, each bridging a pair of equalizing blocks and supported thereon.

4. A bearing comprising a rotatable member having an annular bearing surface, a stationary base, a leveling washer thereon, an equalizing ring mounted on the leveling washer, a plurality of bearing balls mounted on the ring, a ball cage for holding the balls in position, equalizing blocks severally and tiltably mounted on the balls and bearing shoes each bridging a pair of equalizing blocks and supported thereon, and a shoe cage for maintaining the relative positions of the shoes and equalizing blocks.

5. A bearing comprising a rotatable member having an annular bearing surface, a stationary base, a leveling washer thereon, an equalizing ring mounted on the leveling washer, a plurality of bearing balls mounted on the ring, a ball cage for holding the balls in position, equalizing blocks severally and tiltably mounted on the balls and bearing shoes each bridging a pair of equalizing blocks and supported thereon, and means for permitting a limited rotative movement of the shoes and equalizing blocks upon the balls.

6. A bearing comprising a rotatable member having an annular bearing surface, a stationary base, a leveling washer thereon, an equalizing ring mounted on the leveling washer, a plurality of bearing balls mounted on the ring, a ball cage for holding the balls in position, equalizing blocks severally and tiltably mounted on the balls, and bearing shoes each bridging a pair of equalizing blocks, and supported thereon, a shoe cage for maintaining the relative positions of the shoes, and means for permitting a limited rotative movement of the ball cage and balls relative to the ring, and a limited movement of the shoe cage, shoes and equalizing blocks on the balls, whereby the pivotal support established for each equalizing block by one of the bearing balls is shifted from one side of the center of the block to the other.

7. A thrust bearing comprising a plurality of equalizing blocks, means for supporting the blocks at one side or the other of their centers depending on the direction of bearing operation, and bearing members mounted on the blocks, each member being supported by a pair of adjacent blocks.

8. A thrust bearing comprising equalizing blocks, a plurality of bearing shoes each mounted upon a pair of said equalizing blocks, and means dependent upon the direction of bearing operation for supporting the blocks so that the resultant reaction of the support on each shoe is automatically shifted to one side of the center of the shoe.

In witness whereof, I have hereunto set my hand, this 5th day of August, 1916.

HARRY A. S. HOWARTH.